April 8, 1941.                P. E. HAWKINSON                2,237,819
              TIRE CASING AND METHOD OF PRODUCING THE SAME
                   Filed Aug. 9, 1937            2 Sheets-Sheet 1
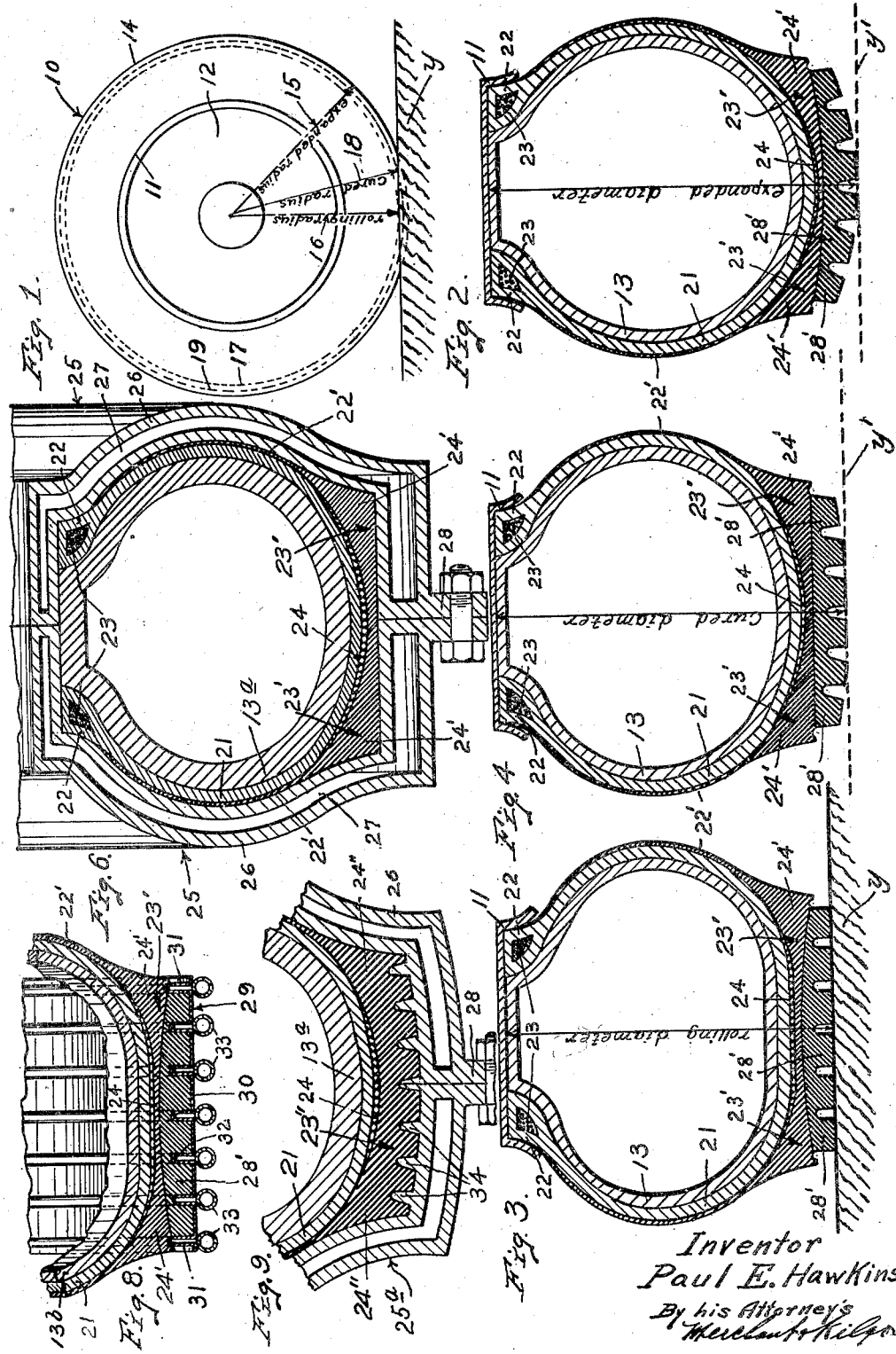
Inventor
Paul E. Hawkinson
By his Attorneys April 8, 1941.   P. E. HAWKINSON   2,237,819
TIRE CASING AND METHOD OF PRODUCING THE SAME
Filed Aug. 9, 1937   2 Sheets-Sheet 2
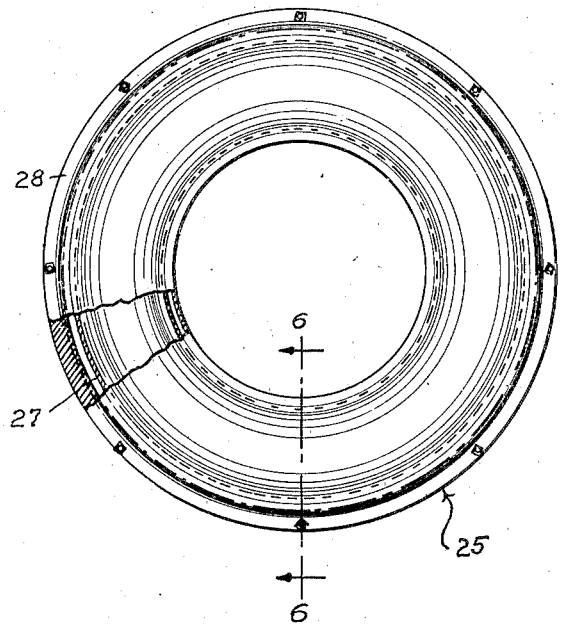
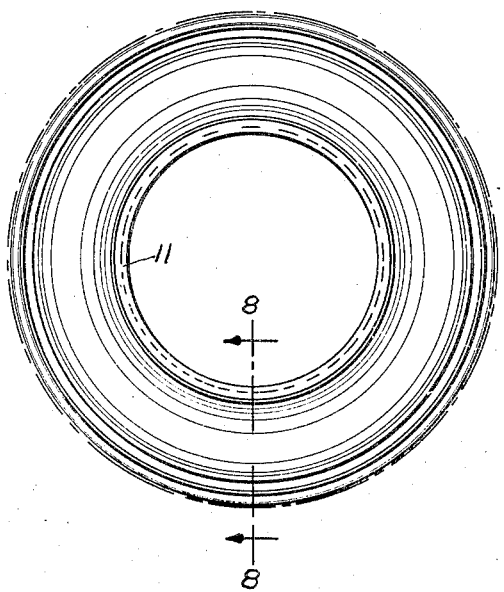
Inventor
Paul E. Hawkinson
By his Attorneys

UNITED STATES PATENT OFFICE 2,237,819

TIRE CASING AND METHOD OF PRODUCING THE SAME

Paul E. Hawkinson, Minneapolis, Minn.

Application August 9, 1937, Serial No. 158,057

4 Claims. (Cl. 154—14)

My present invention relates to tire casings of the type employed on the wheels of various vehicles such as pleasure automobiles, trucks and busses.

The major objects of this invention, briefly stated, are the provision of a tire casing which, in respect to tire casings hitherto produced, will be subject to less strains, will run cooler, will set up less resistance to the rolling action on the roadbed and will give longer and more dependable service, under normal operating conditions. With the above general objects in view, the invention involves the improved process and product hereinafter described and defined in the claims.

As is well known, ordinary pneumatic tire casings, when inflated to normal pressure and unrestricted, assume a cross-sectionally rounded shape which represents the normal expanded condition of the tire; and when the tire rolls over the road under load, it becomes cross-sectionally distorted at its point of engagement with the road and takes on at its point of engagement with the road a cross-sectionally contracted condition radially of the axis of rotation of the tire and a cross-sectionally laterally expanded condition laterally of the tire. Hence, not only does the cross-sectional shape of the tire change continuously under operating conditions, but the radial measurement of the tire continuously changes from what is herein referred to as the expanded radius of the tire, to wit: the radial measurement of the tire at any point not in engagement with the road, and the minimum or rolling radius of a tire, to wit: the radius of the tire measured in a vertical plane intersecting the axis of rotation of the tire and the center point of contact with the roadbed.

Manufacturers of tires predetermine the permissible amount of distortion or reduction in radius for each particular tire, and internal expanding pressures are recommended which will keep the tire within the predetermined limits of distortion under various different loads. For example, if we assume that a particular tire casing of a low pressure type and having a six-inch cross-sectional diameter is to be allowed three-quarters of an inch radial contraction under engagement with the road, then, for a particular load to be imposed on the tire, an air pressure will be recommended which will permit approximately three-quarters of an inch difference between the expanded and the rolling radius of a tire when subject to that predetermined load.

It has hitherto been the customary practice in the tire industry to cure tire casings, inclusive of the carcass proper, which is usually made up of fibre cords adhered together by a flexible rubber binder, and the tread and side-wall covering material of the tire in one operation and while in a cross-sectionally rounded condition substantially representing the condition or shape that the casing will assume when it is later inflated to rated operating pressure and is unrestrained against outward expansion.

Of course, the elastic elements of a finished casing always tend to retain the casing in and return the same to the shape in which it was cured, and any forced distortion of the casing from its natural or cured shape results in subjecting the elements of the casing to stresses and strains that increase in direct proportion to the extent of distortion from the shape in which it was cured. Hence, it will be seen that in a tire that was cured, in accordance with usual practice, in a condition substantially representing its maximum expanded condition the entire extent of distortion between a condition of expanded radius and a condition of minimum rolling radius will be against the natural tendencies of the elastic elements of the tire. Such extreme forced flexure of the ordinary tire casing produces a high degree of friction within the elastic elements of the tire, which in turn tends to produce excessive casing temperatures under operating conditions and which excessive temperatures rapidly deteriorate and weaken and often prove fatal to tire casings. In addition to the excessive strain and resulting excessive heat produced in tires cured in accordance with the above described conventional practice, other highly objectionable results from this procedure of curing the tire in a condition of maximum expansion are excessive resistance to rolling action over a roadbed and excessive treadwear.

In accordance with the instant invention I propose curing the carcass of the tire casing in a shape representing neither of the extreme shapes encountered in service but in a shape intermediate those two extremes and which will preferably be approximately one-half way between the two extremes. Under this procedure the forced flexure of the tire casing is reduced greatly or, in fact, fifty percent if the desired halfway point is attained. Obviously a casing thus produced will be subject to much less strain under normal operating conditions, will roll over the road easier, will run cooler and will give longer and more dependable service than will a tire of otherwise equal quality but which under the same operating conditions is subject to much greater forced flexure.

Preferably I primarily cure the carcass of the tire with only a partially formed crown tread in one curing operation and while retaining the same in a partially circumferentially and radially contracted and laterally expanded condition, and thereafter apply the road-engaging crown thread material thereto and cure the same in a second curing operation, during which the tire is preferably retained in a laterally expanded circumferentially contracted condition, wherein all points about its circumference have a radius approximating that of the rolling radius of the tire. This preferred procedure further reduces the resistance of the tire to movement over the road, further reduces the heat generated by the tire under normal service and increases materially the life of the tread of the tire.

It will be understood that the road engaging tread thus cured while the crown portion of the casing is in a circumferentially contracted condition, wherein its radius is substantially that of its minimum or rolling radius, will, when the tire is inflated, become stretched very materially but will, nevertheless, tend to return to a condition wherein its radius equals the rolling radius of the tire and will, therefore, be in a substantially neutral condition when it is in engagement with the road. Hence, it will be seen that the tread wave usually produced in the tread of a tire just ahead of its point of engagement with the road over rolling action of the road and which in the usual tire is caused by an accumulation of excessive material at that point, will be greatly reduced, if not entirely eliminated, when the preferred method above indicated is followed. Still other important objects and advantages of the invention will later on be made apparent.

In the accompanying drawings like characters indicate like parts throughout the several views.

Referring to the drawings:

Fig. 1 is a view in side elevation of a pneumatic tire-equipped wheel with the operating load applied thereto;

Fig. 2 is an enlarged transverse sectional view taken in the vicinity of the line marked "expanded radius" in Fig. 1;

Fig. 3 is a similarly enlarged transverse sectional view taken in the vicinity of the line marked "rolling radius" in Fig. 1 and illustrates the cross-sectional shape assumed by the tire adjacent its point of contact with the road under normal loads and pressure;

Fig. 4 is a view similar to Figs. 2 and 3 but illustrating the tire in a cross-sectional shape approximately mid-way between the two extremes illustrated in Figs. 2 and 3 and may be assumed to have been sectioned on the line marked "cured radius" in Fig. 1;

Fig. 5 is a view in side elevation of a manufacturer's type mold containing a tire and having a section broken away to show the tire;

Fig. 6 is an enlarged transverse sectional view taken on the line 6—6 of Fig. 5 and illustrating the casing as being in a cross-sectional condition, like in Fig. 4;

Fig. 7 is a view in side elevation illustrating the tire contained within a mold of the type disclosed in my prior Patents Nos. 1,917,261 and 1,917,262, and which type of mold is referred to in the trade as a "Hawkinson type mold";

Fig. 8 is an enlarged fragmentary transverse sectional view taken on the line 8—8 of Fig. 7; and Fig. 9 is a fragmentary sectional view similar to Fig. 6 but illustrating the tire casing as having a much thicker crown tread applied thereto and the mold as being provided with a proper cavity to receive the additional tread material.

In the drawings the tire casing is indicated as an entirety by the numeral 10. In Figs. 1 to 4 inclusive and 7, the tire casing is illustrated as being provided with a conventional type tire rim, indicated as an entirety by 11, and Fig. 1 the rim-equipped tire casing is illustrated as being mounted on a suitable wheel 12 of an automobile or other similar vehicle. In Figs. 2, 3 and 4 the tire casing is shown as being provided with the customary inner tube 13, and in Figs. 6 and 9 the tire is illustrated as being provided with a heavier type of inner tube 13a that is customarily used to inflate tires while subject to heat and pressure for the curing operation. These heavy-type inner tubes 13a are more commonly referred to in the tire trade as air bags. In Figs. 1 and 3 a flat surface, presumably a roadbed, is indicated by y, and in Figs. 2 and 3 horizontal lines y' have been drawn as an aid in comparing Figs. 2, 3 and 4; and it should be noted that in Figs. 2, 3 and 4 the upper extremes of the tire casing are in the same horizontal plane.

In Fig. 1 the maximum expanded circumference of the tire casing 10 is indicated by a solid circle 14; the expanded radius of the tire is indicated by a broken line 15; the rolling radius of the tire casing is indicated by a broken line 16; the circumference of the casing, when the periphery thereof is circumferentially contracted so that all points about its circumference have a radial measurement equal to that of the rolling radius, is indicated by a broken circle 17; the radius of the tire casing, when reduced just halfway between the maximum expanded radius indicated by line 15 and the minimum or rolling radius indicated by line 16, is indicated by full line 18; and the circumference of the tire, when the peripheral portion thereof is circumferentially contracted so that all points about the circumference have a radial measurement equal to that at full line 18, is indicated by broken circle 19.

The first step in the method consists in building up a tire carcass 21 of suitable raw materials such as cord plies insulated apart and bound together by raw gum rubber and incorporating suitable rim engaging bead portions 22, which will usually be reinforced by steel wires or the like 23. This initial step in the process may be carried out in accordance with standard tire manufacturing practice but preferably will deviate from standard practice in the matter of the shape to which the carcass is initially built up; for example, the carcasses of tire casings are usually built up to a cross-sectional shape, which will substantially correspond to the ultimate expanded shape of the tire; whereas, I preferably built up the tire carcass to have a precured shape corresponding approximately to Figs. 4 and 6, wherein the casing carcass is laterally expanded and circumferentially contracted about its complete circumference so that the radius thereof taken at any place about the circumference is intermediate and preferably just halfway between the maximum expanded radial condition, indicated by Fig. 2 and full line 14 in Fig. 1, and the maximum contracted or rolling condition of the tire, indicated in Fig. 3 and by broken line 16 in Fig. 1. In other words, the tire carcass is preferably built up in a raw state to a laterally expanded circumferentially contracted condition, wherein all points about its circumference have a radial measurement equal to that of the carcass of the finished product, when the finished product is circumferentially contracted to the condition indicated by broken circle 16 in Fig. 1 and also represented in Fig. 4.

The next step in the process consists in applying a suitable rubber side-wall covering 22' and an incomplete base or crown tread material 23'. This last step may be carried out with conventional practice and may include the application of a suitable breaker strip 24 between the base tread material 23' and the carcass. As indicated particularly in Fig. 9, the base tread material 23" may be comparatively very thick and include the design containing portion of the tread to be worn off in service, but in accordance with the preferred method, this initially applied crown tread material will be relatively quite thin except at its thick shoulder portions 24' and will be devoid of that portion of the ultimate tread which usually contains a molded design or pattern which is worn off in use. The side-wall covering material 22' and base tread material 23' may be of conventionally employed rubber composition.

The next step consists in curing the tire casing and its applied side wall covering and crown tread material while holding the same in intermediate shape last described. This last described step may be carried out by placing the casing within and curing the same in a mold which embraces the tire about its entire circumference and has an internal cavity shaped to receive the tire thusly built up and retain the same in the desired intermediately distorted condition. Such a mold is indicated by 25 in Fig. 6 and comprises a pair of laterally opposed annular sections 26, each containing suitable steam jackets 27. The sections 26 are adapted to be drawn together about opposite halves of the tire casing through the medium of bolt-equipped flanges 28.

Except for the shape of the cavity of the mold the character thereof is not important since any of the full circle type molds employed in connection with the manufacturing of tire casings is satisfactory for the purpose, providing the cavities thereof are of the proper contour. The tire casing, before being placed in the mold 25, is provided with a suitable air bag 13a and is inflated to such pressure as is deemed advisable by the manufacturer, and thereafter the mold is heated to desired temperature and for a time interval necessary to properly cure the rubber materials in the tire. In accordance with the present illustration, such heating would be brought about by application of steam in the cavities 27 of the mold. After the curing operation has been completed the tire will be removed from the mold and will thereafter tend to remain in and return to this condition of partial distortion, wherein its peripheral circumference is reduced to a point where the radial measurement thereof at any point about its circumference is approximately halfway between the maximum expanded radius of the tire, when fully inflated and unconfined, and the minimum or rolling radius of the tire, when subject to and given load and rated internal pressure.

The next step in the preferred method consists in applying to the incomplete crown or base tread material 23' a band of additional tread material 28', such band of tread material being of slightly less width than the lateral distance between the edges of the previously finished shoulders 24'. This band of tread material 28', which will usually be of high grade rubber-composition tread stock, will be cemented in a raw state to the crown of the previously cured and formed tread material.

The next step in the preferred process consists in curing this last applied band of additional crown tread material to the previously cured base tread material of the casing while holding the casing in a condition of complete circumferential distortion, wherein the peripheral portion of the newly applied crown tread material has a lateral contour and a radial measurement at all points about the circumference thereof approximating that of the rolling radius of the finished product. In other words, during the last step the casing will be contracted circumferentially so that the peripheral portion of the newly applied tread will have a circumference substantially as indicated by broken circle 17 in Fig. 1 and a radial measurement at any point about its circumference corresponding to the minimum or rolling radius indicated by the broken line 16 in Fig. 1. Still otherwise stated, for this last curing operation the casing will be further circumferentially contracted from the condition indicated in Figs. 4 and 6 to the condition indicated in Fig. 3.

This last curing operation is preferably and can most conveniently be carried out through the use of the methods and apparatus of my prior patents Nos. 1,917,261 and 1,917,262. In Figs. 7 and 8 the tire casing with its last applied band of tread material 28 is illustrated as being applied in a mold of the type disclosed in my prior patents above identified and which is herein indicated as an entirety by 29. The mold 29 is in the nature of a thin metallic band or ring 30, having at its marginal portions radially inwardly projecting annular confining flanges 31 that engage the originally cured crown tread material adjacent the edges of its shoulders 24' and confine the tread material 28' therebetween, while subject to pressure and heat during the curing operation. Intermediate the confining flanges 31 the mold 29 is provided with inwardly projecting design forming flanges 32. For the purpose of heating the annular mold 29 the relatively flat band 30 is provided at its outer surface with circumferentially extended steam conduits 33.

During this last curing operation heat is applied to only that portion of the tire being cured and for a time only sufficient to properly cure the last added band of tread rubber, and, therefore, the previously cured portions of the casing will not suffer from over-curing as is the case when the entire thickness of tread material is applied and cured in one operation. A suitable inner tube or air bag used for the purpose of inflating the tire to a desired pressure during the curing operation is indicated by 13b in Fig. 8.

If it is desired to shorten the process and do the entire curing in one operation, a full thickness of tread material 23" having relatively thick shoulder portions 24" may be originally placed on the tire crown; and the casing, including this full thickness of tread, may be placed for the curing operation in the modified mold, indicated by 25a in Fig. 9, and which is provided with inwardly projecting design-forming surfaces 34.

When the tire, built up and cured in the above described manner, is inflated to normal operating pressure and is unrestrained against outward expansion, it will assume its fully rounded-out maximum expanded condition, indicated in Fig. 2; and when it is placed under rated load, it will assume at its point of maximum engagement with the road a cross-sectional shape, corresponding approximately to Fig. 3; and insofar as the carcass 21 is concerned, it will always tend to return from either of these extreme conditions to the intermediate condition indicated in Fig. 4, since the elastic elements of the carcass were cured in that condition. Hence it will be seen that as the tire rolls over the road under operating conditions, its maximum forced flexure will be only approximately half as great as though the tire were cured in either of its extreme conditions indicated in Figs. 2 and 3, (compare lines $y$ and $y'$ of Figs. 2, 3 and 4). Now insofar as the last applied band of tread material is concerned, it will always tend to return to the condition in which it was cured and which is illustrated in Fig. 3. Hence, the tread wave, which usually is produced in the tread of a tire just ahead of its point of engagement with the road under rolling action, is substantially eliminated, for the tread, being in an expanded condition when the casing is expanded, tends to contract when the circumference of the tread is shortened under flattening action at the point of engagement with the load.

In some instances it may be desirable to build up the tire carcass to a shape approximately corresponding to its ultimate expanded condition and thereafter distorting the same to a condition of intermediate lateral expansion and circumferential contraction and curing the same in such distorted condition. However, even with the process thus modified the finished carcass will always tend to retain and return to the condition of intermediate circumferential contraction and lateral expansion in which it was cured, and which condition is represented in Figs. 4 and 6.

What I claim is:

1. A tire casing comprising a carcass made up of flexible reinforcing elements held together by an elastic binding material, and a road-engaging crown tread material applied over the crown portion of the carcass, the elastic elements of the carcass being, when the casing is inflated and unrestrained against outward expansion, subject to their own yielding tension to distort to a laterally expanded circumferentially contracted condition wherein all points about the circumference thereof have a radius approximately midway between the normal expanded radius thereof and the normal rolling radius thereof, the said road-engaging crown tread material being, when the casing is inflated and unrestrained against outward expansion, subject to its own yielding tension to contract circumferentially to a condition wherein all points about the circumference will have a radius approximating that of the normal rolling radius of the tire.

2. A tire casing comprising an elastic carcass, an elastic base tread material applied to the crown portion of the carcass, and an elastic band of road-engaging tread material applied over the said base crown tread material, the elastic elements of the carcass and the said base tread material being, when the casing is inflated and unrestricted against outward expansion, subject to their own yielding tension to distort to a laterally expanded and circumferentially contracted condition wherein all points about the peripheral circumference thereof will have a radius approximately midway between the normal expanded radius thereof and the normal rolling radius thereof, the said band of road-engaging tread material being, when the casing is inflated and is unrestricted against outward expansion, subject to its own yielding tension to contract circumferentially to a condition wherein all points about its circumference have a radius approximately equaling that of the normal rolling radius of the tire.

3. The method of producing tire casings which includes the step of forming the carcass thereof in a raw state of flexible reinforcing elements and a binder that will be elastic when subsequently cured, in applying to the raw carcass a base crown tread material that will be elastic when subsequently cured, in curing the carcass and applied tread material while holding the same in a laterally expanded circumferentially and radially contracted condition wherein all points about its circumference have a radial measurement approximately midway between the expected ultimate expanded radius thereof and the ultimate expected rolling radius thereof, and in thereafter adding additional crown tread material, that will be elastic when subsequently cured, to the previously cured base tread material, and curing the last applied tread material while holding the casing in a laterally expanded circumferentially and radially contracted condition wherein the radial measurement at all points about the circumference thereof will approximately equal the expected rolling radius of the tire.

4. The method of producing tire casings which includes the steps of forming an incomplete casing in a raw state of reinforcing elements and a binder that is elastic when cured, in curing such incompletely formed casing while holding the same in a laterally expanded circumferentially and radially contracted condition wherein all points about its circumference have a radial measurement approximately midway between the expected ultimate expanded radius thereof and the ultimate expected rolling radius thereof, and in thereafter applying to the crown portion of the previously cured incomplete casing an annular band of road-engaging tread material that will be elastic when cured, and curing the newly added tread material while holding the casing in a laterally expanded circumferentially and radially contracted condition wherein the radial measurement at all points about the circumference thereof will approximately equal the expected rolling radius of the tire.

PAUL E. HAWKINSON.